(12) United States Patent
Mellet et al.

(10) Patent No.: US 8,602,934 B2
(45) Date of Patent: Dec. 10, 2013

(54) MULTI-SPEED TRANSMISSION WITH AN INTEGRATED ELECTRIC MOTOR

(75) Inventors: Edward W. Mellet, Rochester Hills, MI (US); James B. Borgerson, Clarkston, MI (US); James M. Hart, Belleville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 109 days.

(21) Appl. No.: 13/269,259

(22) Filed: Oct. 7, 2011

(65) Prior Publication Data

US 2012/0214631 A1 Aug. 23, 2012

Related U.S. Application Data

(60) Provisional application No. 61/444,028, filed on Feb. 17, 2011.

(51) Int. Cl.
*F16H 3/72* (2006.01)

(52) U.S. Cl.
USPC .............. 475/5; 475/290; 475/276; 475/279; 475/280

(58) Field of Classification Search
USPC .............. 475/5, 271, 275, 276, 279, 280, 290
See application file for complete search history.

(56) References Cited

U.S. PATENT DOCUMENTS

| | | | |
|---|---|---|---|
| 6,176,803 B1 | 1/2001 | Meyer et al. | |
| 6,984,187 B2 | 1/2006 | Biermann | |
| 6,991,578 B2 | 1/2006 | Ziemer | |
| 7,011,597 B2 | 3/2006 | Haka | |
| 7,018,319 B2 | 3/2006 | Ziemer | |
| 8,187,130 B1 * | 5/2012 | Mellet et al. | 475/5 |

* cited by examiner

*Primary Examiner* — Derek D Knight

(57) ABSTRACT

A multiple speed transmission for a motor vehicle includes an input member connected to an electric motor, an output member, four planetary gear assemblies, each with first, second, and third members, and a plurality of torque transmitting devices, such as, brakes and clutches. The electric motor can be employed for regenerative braking. Further, the electric motor can be employed to launch and drive the motor vehicle with each of the gear ratios of the multi-speed transmission.

18 Claims, 2 Drawing Sheets

| GEAR STATE | GEAR RATIO | RATIO STEP | TORQUE-TRANSMITTING ELEMENTS | | | | | |
|---|---|---|---|---|---|---|---|---|
| | | | 30 | 32 | 34 | 36 | 26 | 28 |
| REV | -4.965 | | X | | | X | | |
| N | | -1.07 | | | | O | | |
| 1ST | 4.644 | | | X | | X | | |
| 2ND | 2.842 | 1.63 | | | | X | | X |
| 3RD | 2.130 | 1.33 | | X | | | | X |
| 4TH | 1.527 | 1.39 | | | X | | | X |
| 5TH | 1.207 | 1.26 | X | | | | | X |
| 6TH | 1.000 | 1.21 | | | | | X | X |
| 7TH | 0.834 | 1.20 | X | | | X | | |
| 8TH | 0.714 | 1.17 | | | X | | X | |
| 9TH | 0.619 | 1.15 | | X | | | X | |

X = ON - ENGAGED CARRYING TORQUE
O = ON - ENGAGED NOT CARRYING TORQUE

US 8,602,934 B2

MULTI-SPEED TRANSMISSION WITH AN INTEGRATED ELECTRIC MOTOR

RELATED APPLICATION

This application claims the benefit of U.S. Provisional Application No. 61/444,028, filed Feb. 17, 2011, the entire contents of which are incorporated herein by reference.

FIELD

The present invention relates to a multi-speed transmission with a plurality of planetary gear assemblies and a plurality of torque transmitting devices. More specifically, the present invention relates to a nine speed transmission with an integrated electric motor.

BACKGROUND

The statements in this section merely provide background information related to the present disclosure and may or may not constitute prior art.

Extensive engineering and design effort is currently directed to hybrid powertrains for motor vehicles, especially passenger cars. One of the most promising and active areas involves the addition of an electric motor and associated electronic controller to a motor vehicle powertrain to supplement torque for launches in order that a smaller internal combustion engine may be utilized in the vehicle. Lower horsepower and smaller displacement engines routinely provide improved fuel economy over larger engines and, when supplemented by an electric motor for vehicle launch, provide entirely satisfactory overall performance.

Accordingly, many hybrid powertrains begin as adaptations of conventional and existing powertrains utilizing an internal combustion engine and a transmission having a torque converter and multiple planetary gear assemblies. Into this powertrain is added an electric motor and an appropriate launch and disconnect clutch. Frequently, the torque converter is removed. The addition is not without significant challenges, however, as such constraints as axial length, housing outside diameter, clutch actuation, clutch cooling and integration into the existing powertrain components must be addressed and resolved.

Accordingly, there is a need for an improved, cost-effective, compact multi-speed transmission with an integrated electric motor.

SUMMARY

A multiple speed transmission for a motor vehicle includes an input member connected to an electric motor, an output member, four planetary gear assemblies, each with first, second, and third members, and a plurality of torque transmitting devices, such as, brakes and clutches. The electric motor can be employed for regenerative braking. Further, the electric motor can be employed to launch and drive the motor vehicle with each of the gear ratios of the multi-speed transmission.

Further features, advantages, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating the principles of the invention. In the drawings.

DETAILED DESCRIPTION

The following description is merely exemplary in nature and is not intended to limit the present disclosure, application, or uses.

Figure 1A:
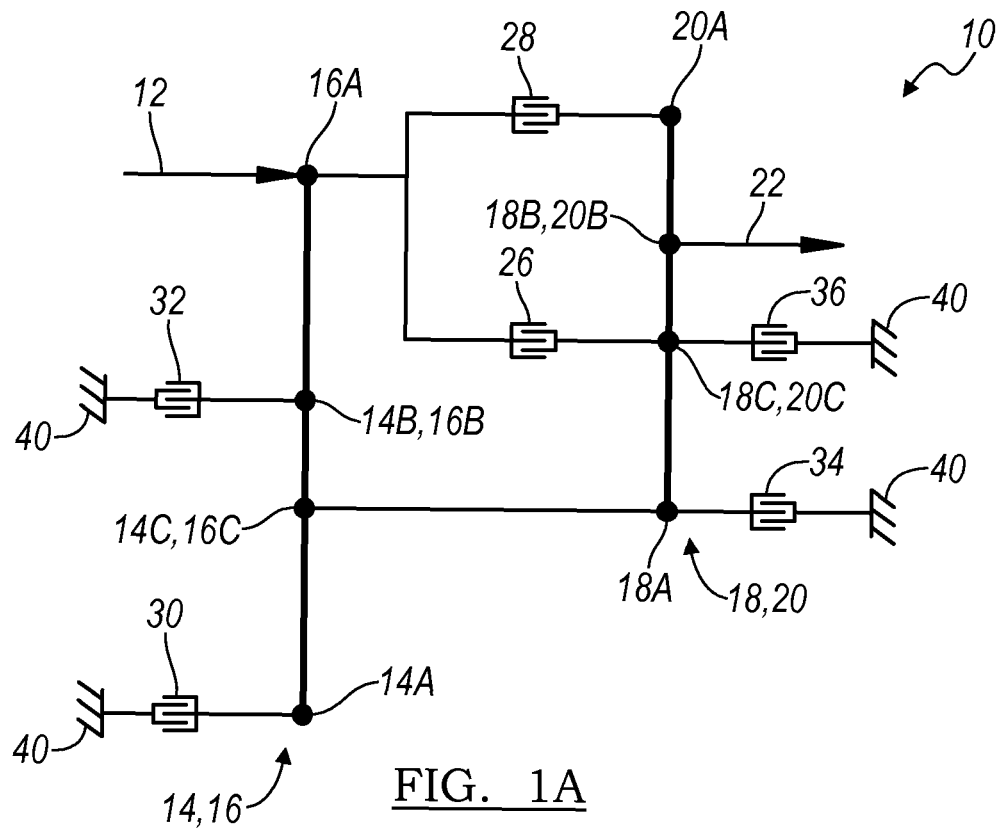
FIG. 1A is a lever diagram of a nine speed transmission represented by dual 4-node levers in accordance with an embodiment of the present invention.
Figure 1B:
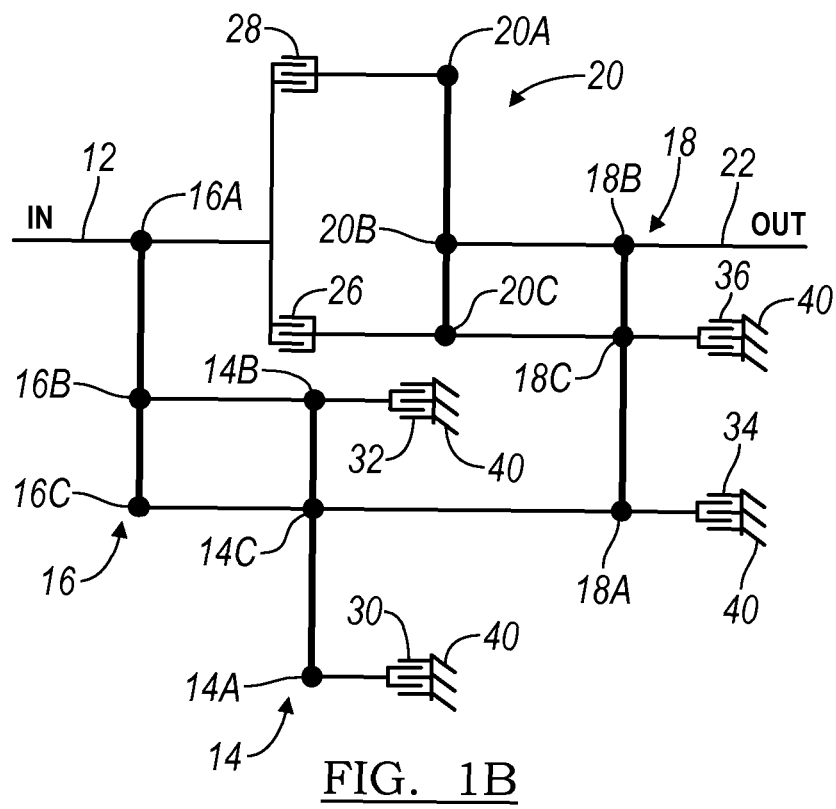
FIG. 1B is a lever diagram of the nine speed transmission represented by four 3-node levers in accordance with an embodiment of the present invention.

Referring now to FIG. 1A, a nine speed transmission 10 for a motor vehicle embodying the principles of the present invention is illustrated in a lever diagram format as dual 4-node levers. A particular embodiment of the nine speed transmission is illustrated in FIG. 1B in a lever diagram as four individual levers, each with three nodes.

A lever diagram is a schematic representation of the components of a mechanical device such as an automatic transmission. Each individual lever represents a planetary gear assembly wherein the three basic mechanical components of the planetary gear assemblies are each represented by a node. Therefore, in FIG. 1B, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever, as illustrated in FIG. 1A. In either representation, the relative length between the nodes of each lever can be used to represent the ring-to-sun ratio of each respective gear assembly. These lever ratios, in turn, are used to vary the gear ratios of the transmission in order to achieve appropriate ratios and ratio progression. Mechanical couplings or interconnections between the nodes of the various planetary gear assemblies are illustrated by thin, horizontal lines and torque transmitting devices such as clutches and brakes are presented as interleaved fingers. If the device is a brake, one set of the fingers is grounded. Further explanation of the format, purpose and use of lever diagrams can be found in SAE Paper 810102, "The Lever Analogy: A New Tool in Transmission Analysis" by Benford and Leising, which is incorporated herein by reference in its entirety.

The transmission 10 includes an input shaft or member 12, a first planetary gear assembly 14 having three nodes: a first node 14A, a second node 14B and a third node 14C, a second planetary gear assembly 16 having three nodes: a first node 16A, a second node 16B and a third node 16C, a third planetary gear assembly 18 having three nodes: a first node 18A, a second node 18B and a third node 18C, a fourth planetary gear assembly 20 having three nodes: a first node 20A, a second node 20B and a third node 20C and an output shaft or member 22.

The input member 12 is coupled to the first node 16A of the second planetary gear assembly 16. The output member 22 is coupled to the second node 18B of the third planetary gear assembly 18 and the second node 20B of the fourth planetary gear assembly 20. The second node 14B of the first planetary gear assembly 14 is coupled to the second node 16B of the second planetary gear assembly 16. The third node 14C of the first planetary gear assembly 14 is coupled to the third node 16C of the second planetary gear assembly 16 and the first node 18A of the third planetary gear assembly 18. The second node 18B of the third planetary gear assembly 18 is coupled to the second node 20B of the fourth planetary gear assembly 20. The third node 18C of the third planetary gear assembly 18 is coupled to the third node 20C of the fourth planetary gear assembly 20.

A first clutch 26 selectively connects the first node 16A of the second planetary gear assembly 16 and the input member 12 with the third node 18C of the third planetary gear assembly 18 and the third node 20C of the fourth planetary gear assembly 20. A second clutch 28 selectively connects the first node 16A of the second planetary gear assembly 16 and the input member 12 with the first node 20A of the fourth planetary gear assembly 20. A first brake 30 selectively connects the first node 14A of the first planetary gear assembly 14 to a stationary member or a transmission housing 40. A second brake 32 selectively connects the second node 14B of the first planetary gear assembly 14 and the second node 16B of the second planetary gear assembly 16 to a stationary member or transmission housing 40. A third brake 34 selectively connects the third node 14C of the first planetary gear assembly, the third node 16C of the second planetary gear assembly 16, and the first node 18A of the third planetary gear assembly 18 to the stationary member or transmission housing 40. A fourth brake 36 selectively connects the third node 18C of the third planetary gear assembly 18 and the third node 20C of the fourth planetary gear assembly 20 to the stationary member or transmission housing 40.

Figures 2, 3:
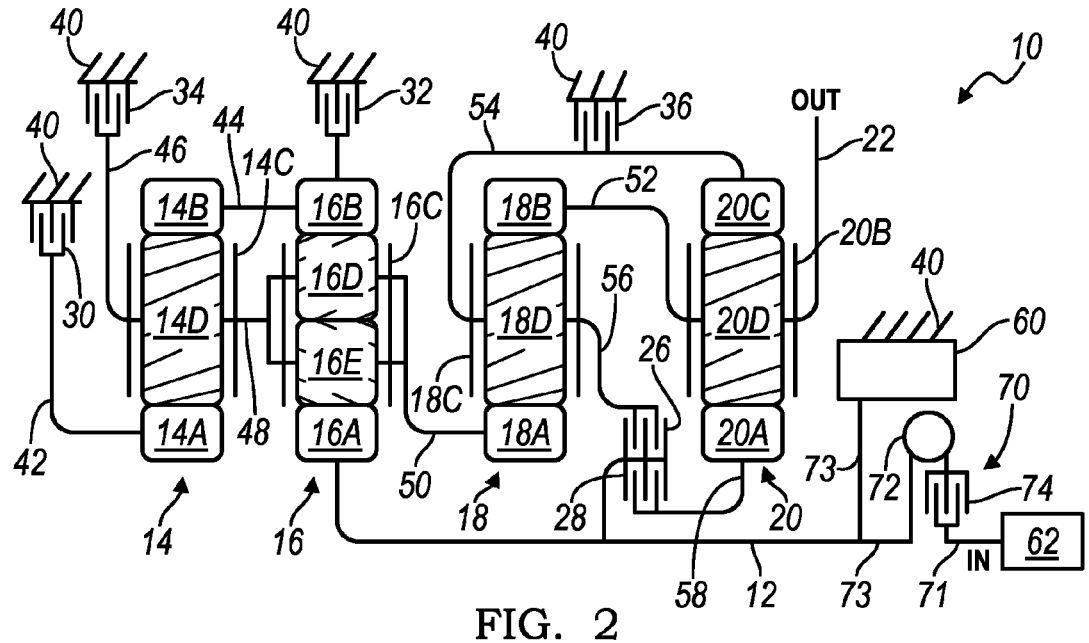
FIG. 2 is a diagrammatic view of the nine speed transmission integrated with an electric motor in accordance with an embodiment of the present invention.
FIG. 3 is a truth table presenting the state of engagement of the various torque transmitting elements in each of the available forward and reverse speeds or gear ratios of the transmission illustrated in FIGS. 1A, 1B, and 2.

Referring now to FIG. 2, a stick diagram presents a schematic layout of the nine speed transmission 10 integrated with an electric motor 60. Generally, an engine 62, such as, for example, an internal combustion engine or an electric engine, or any other type of prime mover, supplies a driving torque to a flywheel, isolator or other connecting device 70 through a shaft or interconnecting member 71. The flywheel 70 includes a damper 72 and is coupled to the electric motor 60 through a shaft or interconnecting member 73, which may be an extension of the input member 12 or a separate member connected to the input member 12. The damper 72 is configured to absorb a portion of torque oscillations generated by the engine 62 and transmitted through the shaft or interconnecting member 71 to the flywheel 70.

The electric motor 60 generally includes a stator and a rotor. The stator includes a plurality of windings or phases and is secured to a ground, stationary member, or the transmission housing 40. The rotor includes a plurality of magnets and/or ferromagnetic members and is positioned radially inwardly of the stator. The rotor of the electric motor 60 is interconnected to the nine speed transmission 10 through the input member 12.

The clutches, brakes, and couplings depicted in FIGS. 1A and 1B are correspondingly presented in FIG. 2, whereas the nodes of the planetary gear assemblies now appear as components of planetary gear assemblies such as sun gears, ring gears, planet gears and planet gear carriers.

For example, the first planetary gear assembly 14 includes a sun gear member 14A, a planet gear carrier member 14C and a ring gear member 14B. The sun gear member 14A is connected for common rotation with a first shaft or interconnecting member 42. The ring gear member 14B is connected for common rotation with a second shaft or interconnecting member 44. The planet gear carrier member 14C rotatably supports a set of planet gears 14D and is connected for common rotation with a third shaft or interconnecting member 46 and a fourth shaft or interconnecting member 48. The planet gears 14D are each configured to intermesh with both the sun gear member 14A and the ring gear member 14B.

The second planetary gear assembly 16 includes a sun gear member 16A, a planet gear carrier member 16C that rotatably supports a set of planet gears 16D and 16E, and a ring gear member 16B. The sun gear member 16A is connected for common rotation with the input member 12. The ring gear member 16B is connected for common rotation with the second shaft or interconnecting member 44. The planet gear carrier member 16C is connected for common rotation with the fourth shaft or interconnecting member 48 and a fifth shaft or interconnecting member 50. The planet gears 16D are each configured to intermesh with both the ring gear member 16B and the planet gears 16E. The planet gears 16E are each configured to intermesh with both the planet gears 16D and the sun gear member 16A.

The third planetary gear assembly 18 includes a sun gear member 18A, a ring gear member 18B and a planet gear carrier member 18C that rotatably supports a set of planet gears 18D. The sun gear member 18A is connected for common rotation with the fifth interconnecting member 50. The ring gear member 18B is connected for common rotation with a sixth shaft or interconnecting member 52. The planet gear carrier member 18C is connected for common rotation with a seventh shaft or interconnecting member 54 and with an eighth shaft or interconnecting member 56. The planet gears 18D are each configured to intermesh with both the sun gear member 18A and the ring gear member 18B.

The fourth planetary gear assembly 20 includes a sun gear member 20A, a ring gear member 20C and a planet gear carrier member 20B that rotatably supports a set of planet gears 20D. The sun gear member 20A is connected for common rotation with a ninth shaft or interconnecting member 58. The ring gear member 20C is connected for common rotation with the seventh interconnecting member 54. The planet gear carrier member 20B is connected for common rotation with the sixth interconnecting member 52 and with the output member 22. The planet gears 20D are each configured to intermesh with both the sun gear member 20A and the ring gear member 20C. The output member 22 is preferably continuously connected with the final drive unit or transfer case.

The torque-transmitting mechanisms or clutches 26, 28 and brakes 30, 32, 34, 36 allow for selective interconnection of the shafts or interconnecting members, members of the planetary gear assemblies and the housing. For example, the first clutch 26 is selectively engageable to connect the eighth interconnecting member 56 with the input member 12. The second clutch 28 is selectively engageable to connect the ninth interconnecting member 58 with the input member 12. The first brake 30 is selectively engageable to connect the first interconnecting member 42 to the stationary member or transmission housing 40 in order to restrict the sun gear member 14A of the first planetary gear assembly 14 from rotating relative to the stationary member or transmission housing 40. The second brake 32 is selectively engageable to connect the second interconnecting member 44 to the stationary member or transmission housing 40 in order to restrict the ring gear member 14B of the first planetary gear assembly 14 and the ring gear member 16B of the second planetary gear assembly 16 from rotating relative to the stationary member or transmission housing 40. The third brake 34 is selectively engageable to connect the third interconnecting member 46 to the stationary member or transmission housing 40 in order to restrict the planet gear carrier member 14C of the first planetary gear assembly 14, the planet gear carrier member 16C of the second planetary gear assembly 16, and the sun gear member 18A of the third planetary gear assembly 18 from rotating relative to the stationary member or transmission housing 40. The fourth brake 36 is selectively engageable to connect the seventh interconnecting member 54 to the stationary member or transmission housing 40 in order to restrict the planet gear carrier member 18C of the third planetary gear assembly 18 and the ring gear member 20C of the fourth planetary gear assembly 20 from rotating relative to the stationary element or transmission housing 40.

Referring now to FIGS. 2 and 3, the operation of the embodiment of the nine speed transmission 10 will be described. It will be appreciated that the transmission 10 is capable of transmitting torque from the input shaft or member 12 to the output shaft or member 22 in at least nine forward speed or torque ratios and at least one reverse speed or torque ratio. Each forward and reverse speed or torque ratio is attained by engagement of one or more of the torque-transmitting mechanisms (i.e. first clutch 26, second clutch 28, first brake 30, second brake 32, third brake 34, and fourth brake 36), as will be explained below. FIG. 3 is a truth table presenting the various combinations of torque transmitting mechanisms that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 3. Of course, other gear ratios are achievable depending on the gear diameter, gear teeth count and gear configuration selected.

To establish reverse gear, the first brake 30 and the fourth brake 36 are engaged or activated. The first brake 30 connects the first interconnecting member 42 to the stationary member or transmission housing 40 in order to restrict the sun gear member 14A of the first planetary gear assembly 14 from rotating relative to the stationary member or transmission housing 40. The fourth brake 36 connects the seventh interconnecting member 54 to the stationary member or transmission housing 40 in order to restrict the planet gear carrier member 18C of the third planetary gear assembly 18 and the ring gear member 20C of the fourth planetary gear assembly 20 from rotating relative to the stationary element or transmission housing 40. Likewise, the nine forward ratios are achieved through different combinations of clutch and brake engagement, as shown in FIG. 3.

During certain operating conditions, it is desirable to hold the output shaft 22 stationary while in a Drive mode of operation, such as holding the motor vehicle on a hill. In order to not engage the electric motor 60 and the engine 62, a combination of the clutches 26, 28 and brakes 30, 32, 34, and 36 must be engaged to hold the transmission output shaft stationary. With reference to FIGS. 1A and 1B, in order to lock the output shaft 22 for any transmission corresponding to the lever diagram, there are three alternative engagement/disengagement strategies: (1) nodes 18C/20C and 18A are grounded (or connected to a stationary housing); (2) the input shaft 12 is disconnected and nodes 14B/16B, 18C/20C, and 18A are grounded (or connected to a stationary housing); or (3) the input shaft 12 is disconnected and nodes 14A, 14B/16B, and 18C/20C are grounded (or connected to a stationary housing). With reference to FIG. 2, in order to lock the output shaft 22, there are three alternative engagement/disengagement strategies: (1) apply or engage the brakes 34 and 36; (2) apply or engage the clutch 26 and the brakes 32 and 34 in combination with an engine disconnect clutch 74 described below; or (3) apply or engage the clutch 26 and the brakes 30 and 34 in combination with the engine disconnect clutch 74.

In various implementations of the transmission 10, the electric motor 60 can be employed to provide regenerative braking. In some implementations, the electric motor 60 can be employed to launch and drive the vehicle with each of the nine forward gear ratios and the reverse gear ratio. By incorporating the engine disconnect clutch 74 between the shaft or interconnecting member 71 and the damper 72, the electric motor 60 can be used to start the engine 62, potentially eliminating the need for a starter motor.

The description of the invention is merely exemplary in nature and variations that do not depart from the gist of the invention are intended to be within the scope of the invention. Such variations are not to be regarded as a departure from the spirit and scope of the invention.

What is claimed is:

1. A multiple speed transmission for a motor vehicle comprising:
   an input member and an output member;
   an electric motor coupled to the input member;
   a first planetary gear assembly with a sun gear, a ring gear, and a planet gear carrier that supports a set of planet gears;
   a second planetary gear assembly with a sun gear coupled to the input member, a ring gear coupled to the ring gear of the first planetary gear assembly, and a planet gear carrier that supports a first set of planet gears and a second set of planet pears and is coupled to the planet gear carrier of the first planetary gear assembly;
   a third planetary gear with a sun gear coupled to the planet gear carrier of the second planetary gear assembly, a ring gear, and a planet gear carrier that supports a set of planet gears; and
   a fourth planetary gear assembly with a sun gear, a ring gear coupled to the planet gear carrier of the third planetary gear assembly, and a planet gear carrier that supports a set of planet gears and is coupled to and drives the output member and to the ring gear of the third planetary gear assembly.

2. The transmission of claim 1 wherein the electric motor provides regenerative braking.

3. The transmission of claim 1 wherein the electric motor launches and drives the motor vehicle.

4. The transmission of claim 1 wherein the electric motor starts an engine of the motor vehicle.

5. The transmission of claim 1 further comprising an isolator coupled to the electric motor and the input member, the isolator receiving a driving torque from an engine of the motor vehicle.

6. The transmission of claim 1 further comprising a flywheel selectably connectable to the electric motor and the input member, the flywheel receiving a driving torque from an engine of the motor vehicle.

7. The transmission of claim 6 wherein the flywheel includes a damper that absorbs a portion of the torque oscillations generated by the engine.

8. The transmission of claim 1 further comprising a plurality of torque-transmitting mechanisms that are selectively engageable to establish at least nine forward speed ratios and at least one reverse speed ratio between the input member and the output member.

9. The transmission of claim 8 wherein a first group of the plurality of torque-transmitting mechanisms are brakes and a second group of the plurality of torque-transmitting mechanisms are clutches.

10. The transmission of claim 9 wherein a first brake of the group of brakes selectively restricts the sun gear of the first planetary gear assembly from rotating relative to a stationary member, a second brake of the group of brakes selectively restricts the ring gear of the first planetary gear assembly and the ring gear of the second planetary gear assembly from rotating relative to the stationary member, a third brake of the group of brakes selectively restricts the planet gear carriers of the first planetary gear assembly and the second planetary gear assembly and the sun gear member of the third planetary gear assembly from rotating relative to the stationary member, and a fourth brake of the group of brakes selectively restricts the planet gear carrier of the third planetary gear assembly and the ring gear of the fourth planetary gear assembly from rotating relative to the stationary member.

11. The transmission of claim 9 wherein a first clutch of the group of clutches selectively couples the input member with the planet gear carrier of the third planetary gear assembly and a second clutch selectively couples the input member with the sun gear of the fourth planetary gear assembly.

12. A multiple speed transmission for a motor vehicle comprising:
   an input member and an output member;
   an electric motor coupled to the input member;
   a flywheel selectably connectable to the electric motor and the input member, the flywheel receiving a driving torque from an engine of the motor vehicle;
   a first planetary gear assembly with a sun gear, a ring gear, and a planet gear carrier that supports a set of planet gears;
   a second planetary gear assembly with a sun gear coupled to the input member, a ring gear coupled to the ring gear of the first planetary gear assembly, and a planet gear carrier that supports a set of planet gears and is coupled to the planet gear carrier of the first planetary gear assembly;
   a third planetary gear with a sun gear coupled to the planet gear carrier of the second planetary gear assembly, a ring gear, and a planet gear carrier that supports a set of planet gears;
   a fourth planetary gear assembly with a sun gear, a ring gear coupled to the planet gear carrier of the third planetary gear assembly, and a planet gear carrier that supports a set of planet gears and is coupled to and drives the output member and to the ring gear of the third planetary gear assembly; and
   a plurality of torque-transmitting mechanisms that are selectively engageable to establish various forward speed ratios and at least one reverse speed ratio between the input member and the output member, wherein the plurality of torque-transmitting mechanism includes a first clutch and a second clutch, and wherein the first clutch selectively couples the input member with the planet gear carrier of the third planetary gear assembly and the second clutch of selectively couples the input member with the sun gear of the fourth planetary gear assembly.

13. The transmission of claim 12 wherein the electric motor provides regenerative braking.

14. The transmission of claim 12 wherein the electric motor launches and drives the motor vehicle.

15. The transmission of claim 12 wherein the electric motor starts an engine of the motor vehicle.

16. The transmission of claim 12 wherein the flywheel includes a damper that absorbs a portion of the torque oscillations generated by the engine.

17. A multiple speed transmission for a motor vehicle comprising:
   an input member and an output member;
   an electric motor coupled to the input member;
   a first planetary gear assembly with a sun gear, a ring gear, and a planet gear carrier that supports a set of planet gears;
   a second planetary gear assembly with a sun gear coupled to the input member, a ring gear coupled to the ring gear of the first planetary gear assembly, and a planet gear carrier that supports a set of planet gears and is coupled to the planet gear carrier of the first planetary gear assembly;
   a third planetary gear with a sun gear coupled to the planet gear carrier of the second planetary gear assembly, a ring gear, and a planet gear carrier that supports a set of planet gears;
   a fourth planetary gear assembly with a sun gear, a ring gear coupled to the planet gear carrier of the third planetary gear assembly, and a planet gear carrier that supports a set of planet gears and is coupled to and drives the output member and to the ring gear of the third planetary gear assembly;
   a first connection between the ring gear of the first planetary gear assembly and the ring gear of the second planetary gear assembly;
   a second connection between the planet gear carrier of the first planetary gear assembly and the planet gear carrier of the second planetary gear assembly;
   a third connection between the planet gear carrier of the second planetary gear assembly and the sun gear of the third planetary gear assembly;
   a fourth connection between the planet gear carrier of the third planetary gear assembly and the ring gear of the fourth planetary gear assembly; and
   a fifth connection between the ring gear of the third planetary gear assembly and the planet gear carrier of the fourth planetary gear assembly.

18. The transmission of claim 17 wherein the electric motor provides regenerative braking and launches and drives the motor vehicle.

* * * * *